Fig. 1.

INVENTOR
Theodore E. Jensen

Aug. 2, 1966  T. E. JENSEN  3,263,394
APPARATUS FOR AND METHODS OF MAKING A MARKING DEVICE
Filed Dec. 26, 1962  6 Sheets-Sheet 3

INVENTOR
Theodore E. Jensen
BY Olson, Trexler
Wolters & Bushnell Aug. 2, 1966 T. E. JENSEN 3,263,394
APPARATUS FOR AND METHODS OF MAKING A MARKING DEVICE
Filed Dec. 26, 1962 6 Sheets-Sheet 5

INVENTOR
Theodore E. Jensen
BY
Olson Trexler
Wolter & Bushnell

United States Patent Office 3,263,394
Patented August 2, 1966

---

3,263,394
APPARATUS FOR AND METHODS OF MAKING A MARKING DEVICE

Theodore E. Jensen, Oak Park, Ill., assignor, by mesne assignments, to Sanford Research Company, a corporation of Illinois
Filed Dec. 26, 1962, Ser. No. 246,968
11 Claims. (Cl. 53—43)

This invention relates generally to marking pens and other fluid-type marking devices. The invention relates more particularly to apparatus for and methods of making a disposable or non-refillable type of marking device.

Fluid-type marking devices commonly comprise a shell or housing, a felt writing tip, and a quantity of marking fluid which is usually absorbed by a reservoir felt contained within the housing and contacted by the writing tip. Various mechanical arrangements have been devised for fabricating the housing and placing the reservoir felt therein; but the subsequent manufacturing operations, including filling the fluid and inserting the writing tip, have been heretofore largely performed by essentially manual procedures, the character of the components and the nature of the specific operations to be performed frustrating the successful application of customary automating techniques.

Therefore, an important object of the present invention is to provide new and improved methods of making a marking device and apparatus therefor.

A more general object of the invention is to implement the manufacture of fluid-type marking devices with rapid, accurate machine operations.

Another object of the invention is to provide apparatus for and methods of accurately filling marking fluid into a device of the type described.

Still another object of the invention is to provide such apparatus and methods which readily accommodate different sized marking devices.

And still another object of the invention is to provide such apparatus and methods which are susceptible of easy change in the volume of the fluid being filled.

A further object of the invention is to provide apparatus for and methods of inserting a flexible, elongated writing tip in a device of the type described.

A yet further object of the invention is to provide apparatus for and methods of impelling a flexible, elongated writing tip into the shell of a marking device in an interference fit.

And a yet further object of the invention is to provide apparatus and methods which eliminate axial distortion of a flexible writing tip while it is being inserted in a partially completed marking device.

These and other objects and features of the invention will become more apparent from a reading of the following descriptions.

Apparatus in accord with the invention includes means for incrementally moving a plurality of open-ended marking devices in a predetermined path; a reciprocable tool overlying the path in alignment with a rest position of a marking device, the reciprocable tool including a pin element adapted to pass through the open end of a marking device compressively to engage a resilient absorptive element contained therein; a plurality of filling nozzles aligned with rest positions of a marking device subsequent to the reciprocable tool and spaced apart along the path for delivering marking fluid to the devices being transported in the path; a wick-inserting arrangement aligned with a rest position of a marking device in the described path subsequent to the filling nozzles; and a reciprocable crimping tool overlying a rest position of a marking device, the crimping tool having a formation adapted to constrict the open end of the marking device upon forcible engagement therewith.

The invention, both to its structure and mode of operation, will be better understood by reference to the following disclosure and drawings forming a part thereof, wherein.

Figure 3:
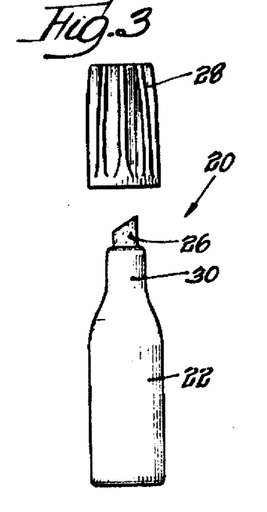
FIG. 3 is an elevational view of a marking device and cap therefor of the type contemplated by the invention, the marking device being shown in approximately actual size.
Figures 4, 5:
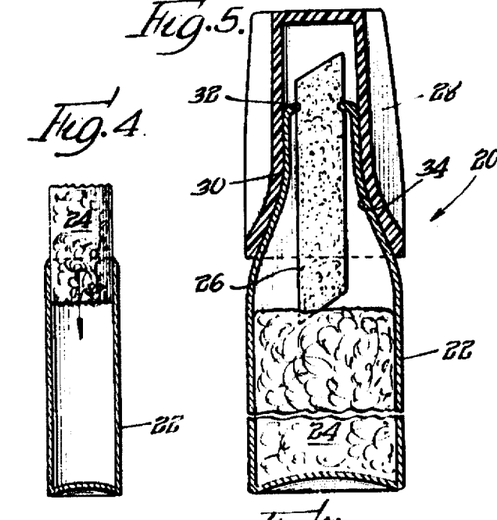
FIG. 4 is a central cross-sectional view showing the insertion of a reservoir felt into a closed-end tube in the preparation of a marking device for filling.
FIG. 5 is an enlarged, central cross-sectional view of a completed marking device.

Referring now in detail to the drawings, specifically to FIGS. 3–5 inclusive, a marking device of the general type contemplated by the present invention is indicated generally by the numeral 20 and will be seen to include a tubular housing or shell 22, a reservoir felt 24, a felt wick 26 contacting the reservoir felt, and a cap element 28.

The housing 22 is desirably formed as a unitary member by impact extruding or by drawing a suitable sheet metal. Initially, the housing is formed as a straight tubular element as shown in FIG. 4; and after the reservoir felt 24 has been inserted therein, the open end of the housing is necked down at 30 as is shown in FIGS. 3 and 5. The reservoir felt 24 may conform to the shape of and fill the lower, larger diameter portion of the housing, as shown, or it may take a somewhat different shape and substantially fill the lower portion of the housing.

The reservoir felt 24 comprises one particularly advantageous form of a porous, absorbent body; but reservoir elements of other absorbent materials capable of being saturated with ink or some other marking fluid can be used to replace the reservoir felt 24.

When the reservoir felt has been inserted in the housing and after a suitable quantity of marking fluid has been filled into the housing and absorbed by the reservoir felt, the wick 26 is inserted in the necked down portion 30 of the housing and the edges or lips thereof are crimped over at 32 to grip the wick and hold it in fluid communication with the reservoir felt 24. The felt wick 26 projects from the upper end of the housing so that it may be rubbed against a surface to be marked, the marking fluid being transmitted from the reservoir element to the wick to replenish the marking fluid used up in the course of marking such a surface. As will be recognized, the housing 22 may be held in the hand much like a pen, thick crayon or other marking element.

The cap 26 is used for covering the exposed end of the felt wick 26 when the marking device is not in use; and the cap element 28 is fashioned with a flared bore 34, best seen in FIG. 5, which conforms to the tapered section and the necked down portion of the housing in order that the cap element may be frictionally assembled to the top of the housing for retention thereon.

Figure 1:
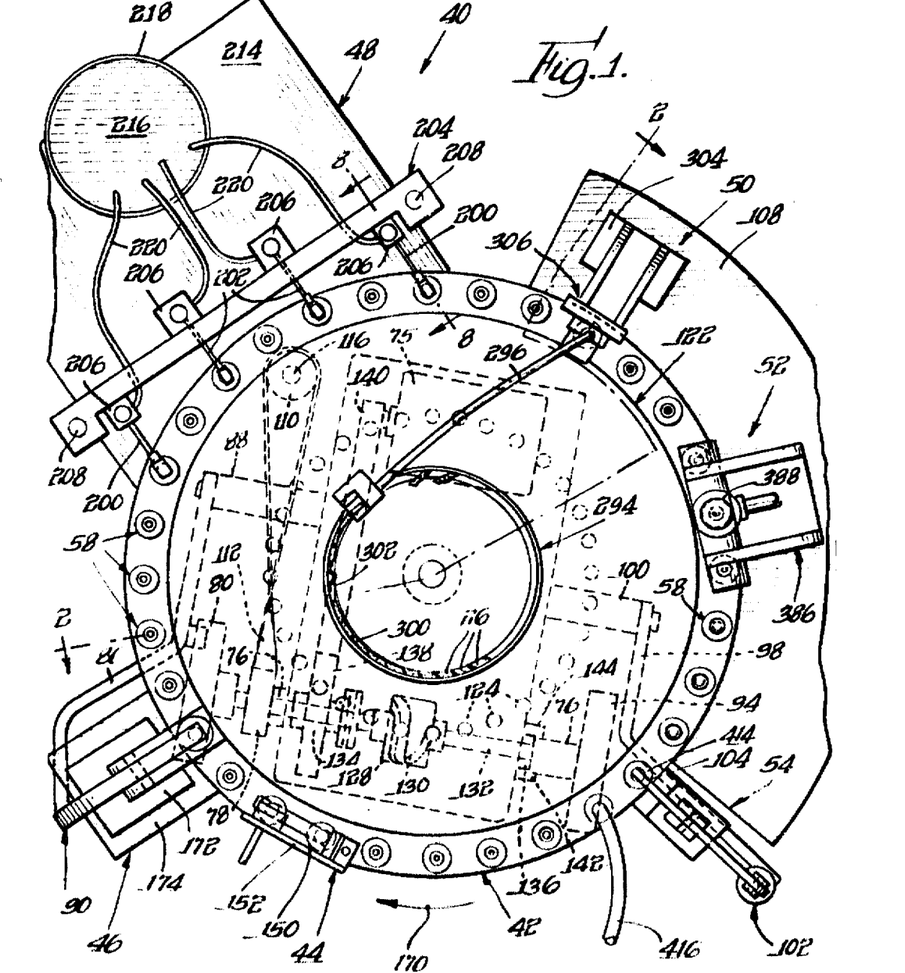
FIG. 1 is a top plan view of apparatus constructed in accordance with the principles of the present invention.
Figure 2:
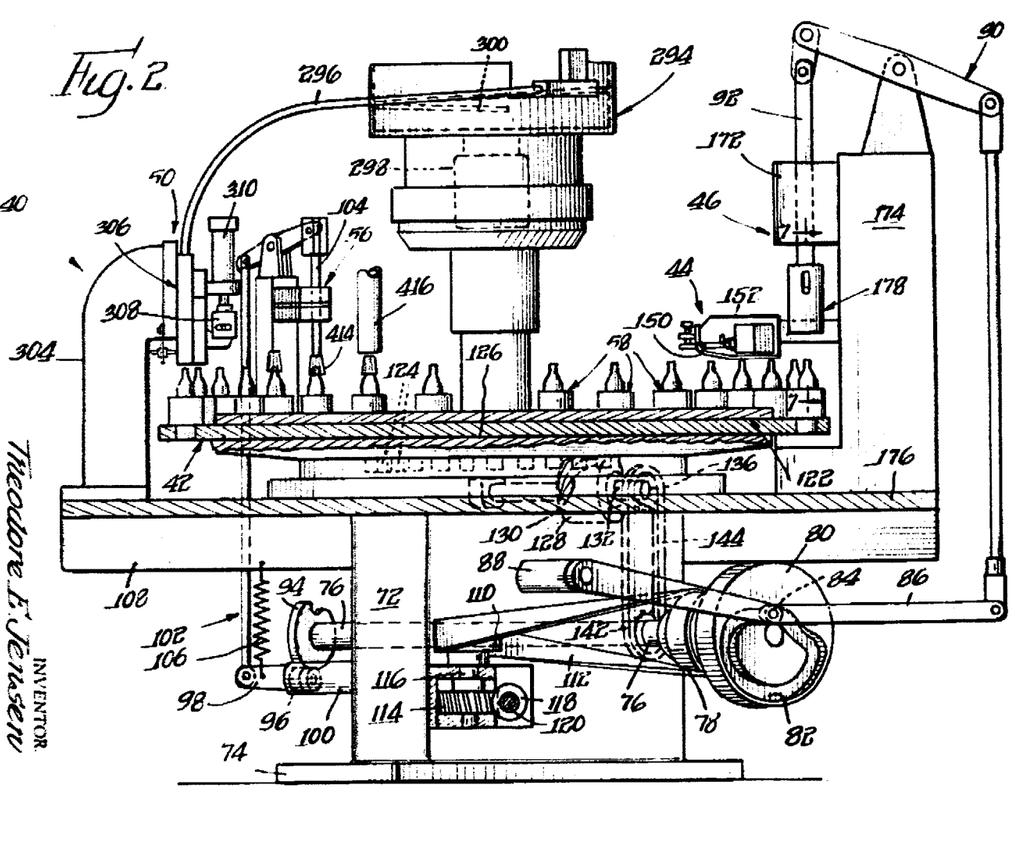
FIG. 2 is an elevational view taken substantially along the line 2—2 of FIG. 1.

Turning now to FIGS. 1 and 2, apparatus indicated generally by the numeral 40 embodies the principles of the invention and is arranged to operate in compliance with the methods thereof. The apparatus 40 is intended to receive unfinished marking devices which have previously been manufactured to the extent of the reservoir felt 24 being inserted in the tubular housing 22 and the necked down portion 30 being formed on the housing. Upon receipt of these partly finished marking devices, the apparatus 40 is arranged to complete the manufacture by filling the marking fluid, inserting the felt wicks 26, crimping the lips 32 and mounting the cap elements 28.

The apparatus 40 includes a table or dial 42 which is adapted to receive a number of the partly finished marking devices, a checking station 44, a combined tamping and flaring station 46, a filling station 48, a wick-inserting station 50, a crimping station 52, and a cap assembling station 54. While the various stations incorporated in the apparatus 40 are shown to be arranged in a circular path and whereas the table 42 is shown to take circular form for rotation to define such a path, it is recognized that the several work stations may be arranged linearly or in some other predetermined path, in which case, the table is replaced by some other suitable conveyor. However, the circular arrangement of the work stations which has been shown is advantageous in that it presents a compact unit which is economical in its factory floor space requirement.

Figure 6:
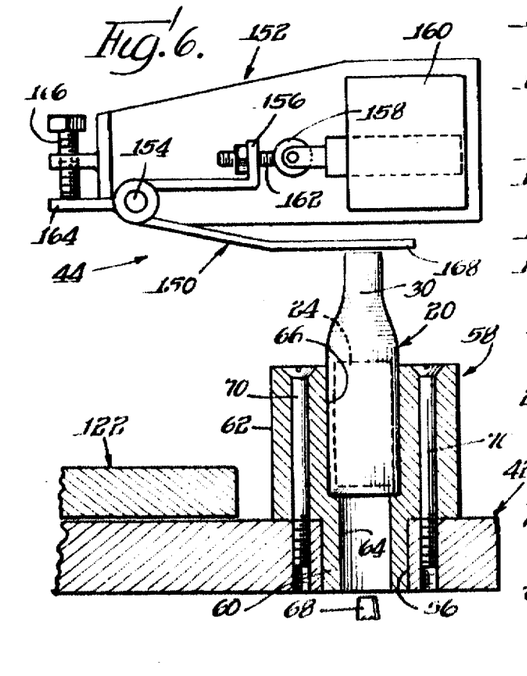
FIG. 6 is an enlarged, side elevational view of the checking station used in the apparatus of FIG. 1 as an initial work station.

The table or dial 42 is arbitrarily selected to be a 32-position member; and at each of these positions, the table is perforated with a hole 56, best seen in FIG. 6. The holes 56 cooperate in defining mounting means and are disposed adjacent the periphery of the table 42 at angular intervals corresponding to the angular increments of movement of the table. In order to hold a marking device at each of the positions established by the holes 56, a nest element or receptacle 58 is fashioned with a stem portion 60 which defines a coupling member to be fittingly received in one of the holes 56. A larger diameter body portion 62 of the nest element defines a shoulder which abuts the upper surface of the table 42, whereas a bore 64 and a counterbore 66 are drilled in the nest element 58. Bore 66 receives the closed, lower portion of the shell of a marking device, and the bore 64 provides access to the bottom of the marking device, as for example to facilitate ejection of the marking device from the nest element by means of an air nozzle 68. The nest elements 58 are advantageously affixed to the table 42 by means of diametrically disposed screws 70; and it is to be realized that provision of detachable nest elements permits the apparatus 40 to accommodate different sized marking devices by selection of a proper sized nest element.

Returning to FIGS. 1 and 2, and with primary reference to FIG. 2, the table 42 will be seen mounted on a pedestal 72, pedestal 72 housing the power plant and terminating in a floor mounting flange 74 by which the apparatus 40 is secured in place. A drive motor 75, best seen in FIG. 1, is arranged to rotate a shaft 76 continuously; and one end of the shaft 76 extends through a sidewall of the pedestal 72 to have a pulley 78 and a cam plate 80 mounted thereon as will be seen in FIG. 2. A cam slot 82 is fashioned in the plate 80 to receive and guide the movements of a roller 84 that is rotatably secured to a medial portion of a deflected arm 86. Arm 86 is pivoted to the pedestal 72 at a mounting 88; and the movements of arm 86 act through a system 90 of mechanical linkages to reciprocate a piston 92 in periodic fashion. Piston 92 comprises the actuating member of the tamping and flaring station 46 as will be described more fully hereinafter.

In a somewhat similar fashion, a cam 94 is secured to the opopsite end of shaft 76 outside the pedestal 72; and cam 94 coacts with a roller 96 which is mounted on a deflected arm 98, arm 98 being pivotally mounted to pedestal 72 at a bracket 100. The movements of arm 98 which are occasioned by rotation of the cam 94 act through a system 102 of mechanical linkages to reciprocate a piston 104 in a periodic manner. Piston 104 comprises the actuating member in the cap assembling station 54 as will be described more fully hereinafter. Advantageously, a return spring 106 is extended between the arm 98 and a platform extension 108 of the pedestal 72 for insuring contact between the roller 96 and the operating surface of cam 94.

The pulley 78 transmits power to a pulley 110 by means of an endless belt 112 trained therebetween; and pulley 110 is connected to a worm gear 114 by a shaft 116. Gear 114 meshes with a worm 118 to rotate a shaft 120, shaft 120 providing motive power to the filling station 48 as will be described more fully hereinafter.

A circular plate 122 is situated overlying the table 42 and is fixed relative to the pedestal 72 to expose an annular portion of the table 42 at the periphery thereof. In order to drive the table 42 in a rotatably incremental manner, a sequence of arcuately spaced pins 124 are secured to the underside of table 42 by means of a plate 126 rigid therewith. A barrel cam 128 is fashioned with a cam groove 130 in its cylindrical surface; and the pins 124 selectively engage the groove 130 so that, upon rotation of the barrel cam 128, the table 42 is stepped or moved in arcuate increments, rest positions of the nest elements being defined at the end of each of the stepped movements of the table 42.

The barrel cam 128 is mounted for rotation on a shaft 132. A pair of pulleys 134 and 136 are also mounted on the shaft 132 respectively spaced from the opposite ends of the barrel cam as is best shown in FIG. 1. Pulley 134 communicates, by means of an endless belt 138, with a pulley 140 fixed on the output shaft of drive motor 75 whereby to rotate the barrel cam; and pulley 136 is coupled to a pulley 142 that is mounted on shaft 76 whereby to energize stations 48 and 54. An endless belt 144 achieves this coupling of pulleys 136 and 142 as will be seen in FIG. 2.

Considering that the partially finished, open-ended marking devices are inserted in empty nest elements between the cap assembling station 54 and the checking station 44, it will be observed in FIG. 1 that four open stations are provided at this location to facilitate hand feeding of the unfinished marking devices into the nest elements. Turning to FIG. 6 for a more detailed description of the arrangement of checking station 44, a feeler arm 150 will be seen mounted to a housing 152 at a pivot 154. The arm is deflected beyond the pivot 154 to dispose an end portion 156 in confronting relationship with an operator 158 which extends from a microswitch 160, a threaded finger 162 being mounted to the end portion 156 for making the actual engagement with the operator 158. The feeler arm 150 also includes an offset portion 164 which cooperates with an adjusting bolt 166 in establishing the rest or normal position of a horizontal, sensing portion 168 of the feeler arm.

The sensing portion 168 is disposed overlying the path through which the marking devices are moved toward the combined tamping and flaring station; and the height at which the sensing portion is disposed above the table 42 permits the feeler arm 150 to determine that the marking devices 20 are properly seated in the nest elements 58 and to determine that the necked down portion 30 of the marking devices is not excessively long. When a malpositioned or overlength marking device abuts the sensing portion 168 of the feeler arm, the microswitch 160 is actuated to operate a valve and cause a blast of air to eject the defective marking device as by means of a nozzle, such as the nozzle 68, positioned processwise upstream from the checking station. Thus, the checking station prevents jamming at the filling station or the wick-inserting station and also checks for the possibility of a completed marking device passing through the unloading station.

The drive arrangements associated with the pedestal 72 act to rotate the table 42 incrementally and in the direction indicated generally by the numeral 170 in FIG. 1. Therefore, the unfinished marking devices which have been loaded into the nest elements between cap assembling station 54 and checking station 44 progress to the combined tamping and flaring station 46 after leaving the checking station. Referring to FIG. 2, the piston 92 is seen guided for vertical reciprocation by a bearing block 172, bearing block 172 being fastened to a mounting bracket 174 that is supported on an extension 176 of the pedestal 72. Bracket 174 supports the system 90 of linkages that transmits motion to the piston 92; and a vertically reciprocable tooling unit 178 is carried on the lower end of piston 92 to perform the work operations at station 46.

Figure 7:
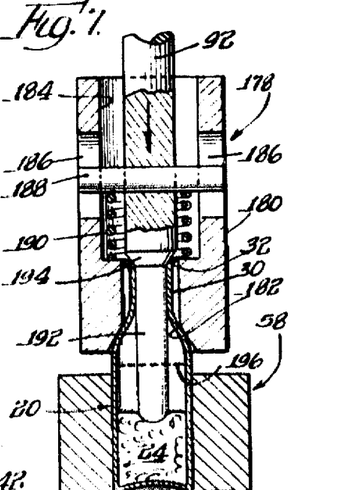
FIG. 7 is an enlarged, central cross-sectional view in side elevation taken along the line 7—7 of FIG. 2 and showing the tooling of the combined tamping and flaring station where the reservoir felt is compressed inside the housing and the mouth of the housing is flared to facilitate subsequent insertion of a felt wick.

Turning to FIG. 7, the tooling unit 178 is seen to comprise a cylindrical member 180 which is bored at its lower end with a conical aperture 182, aperture 182 conforming to the shape of the necked down portion 30 of the marking device and the tapered shoulder portion adjacent thereto. The upper end of cylindrical member 180 is provided with a bore 184 in which the piston 92 operates. Opposite sidewall portions of the member 180 are fashioned with vertical slots 186 in the vicinity of bore 184, and a cross pin 188 is assembled to the piston 92 so that its opposite ends may ride in the slots 186. Thus, a certain amount of relative movement is permitted between the cylindrical member 180 and the piston 92. A compression spring 190 is disposed in the bore 184 beneath the cross pin 188 to bias the cylindrical member 180 in a generally downward direction.

The piston 92 terminates at its lower end in a hardened bullnose pin 192 having a tapered shoulder portion 194 at its juncture with the piston. When the tooling unit 178 is lowered into contact with a marking device 20 disposed at rest therebeneath, the free end of pin 192 enters the open end of the necked down portion 30 as the aperture 182 of the cylindrical member 180 fits down over the upper end of the marking device. Further downward movement of the tooling unit 178, as urged by piston 92, causes the pin 192 to engage the reservoir felt 24 compressing the felt, enlarging the headspace in the housing 22, and exhausting air from the voids in the felt. When the tapered shoulders portion 194 engages the lip 32 of the marking device, it acts to flare the lip, thereby facilitating subsequent insertion of a felt wick in the necked down portion 30. At the same time, the pin 192 compresses the reservoir felt to a fraction of its original volume. As shown in FIG. 7, the reservoir felt has been compressed from the level indicated by broken line 196 to the condition shown in solid outline. This compression of the reservoir felt encourages rapid absorption of the marking fluid that is subsequently introduced into the marking device. As will be recognized, this compression of the reservoir felt also increases the headspace over the reservoir felt whereby to accommodate the filling of comparatively large volumes of the marking fluid therein.

After the reservoir felt 24 has been compressed at station 46, the tooling unit 178 is retracted, and the table 42 is indexed to pass the marking device containing the compressed reservoir felt to the fillings station 48. As will be seen in FIG. 1, the filling station 48 spans seven positions on the table 42 and includes four filling positions, defined by a pair of distal filling nozzles 200 and a pair of proximal filling nozzles 202. The four filling positions defined by the nozzles 200 and 202 are spaced apart by double the spacing between the nest elements 58 whereby to establish open positions intermediate the filling positions for allowing marking fluid filled into the marking devices to soak into the reservoir felt. By so arranging the filling station 48, a fraction of the fill of marking fluid can be injected into a given marking device in each of four positions; and while it is advantageous to fill one quarter of the total volume of marking fluid at each of the filling positions, it is also useful to fill a somewhat larger fraction at the first distal nozzle 200 and a lesser fraction of the total fill at the terminal distal nozzle. As will be recognized, the described arrangement of the filling station 48 results in a progressive fill of marking fluid into the marking devices being processed.

Figures 8, 9, 10:
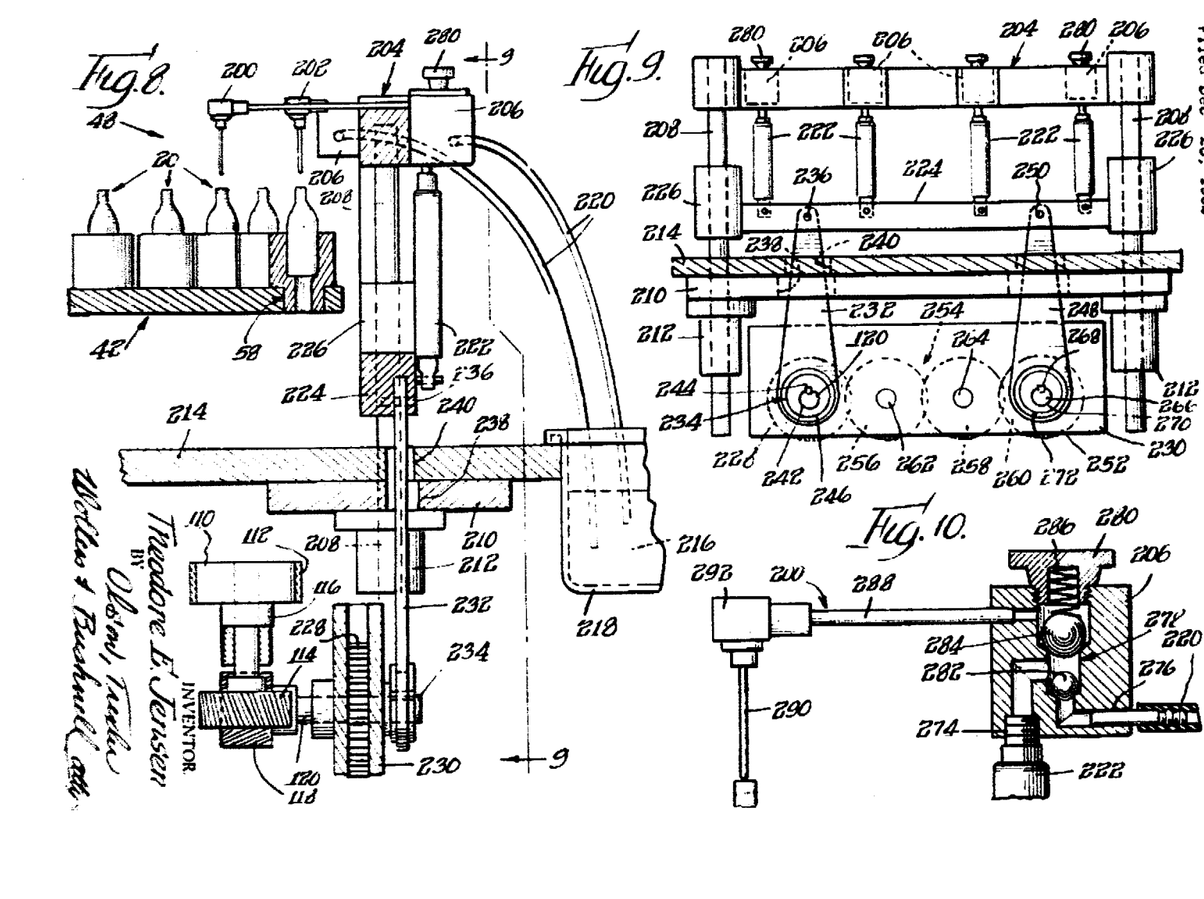
FIG. 8 is an enlarged view taken along the line 8—8 of FIG. 1 and illustrating the filling station which is disposed processwise subsequent to the combined tamping and flaring station.
FIG. 9 is a reduced scale view taken along the section 9—9 of FIG. 8.
FIG. 10 is an enlarged, cross-sectional view taken in side elevation and showing details of a valve and filling nozzle used at the filling station of FIG. 8.

The nozzles 200 and 202 are secured to a top mounting bar 204 at valve blocks 206. The top mounting bar is disposed in fixed position at the top ends of vertical shafts 208, shafts 208 being fastened to a machine mounting plate 210 by sockets 212 as is shown in FIGS. 8 and 9. The machine mounting plate, in turn, is fastened to a base plate 214 which extends from and is rigidly connected to the pedestal 72.

Considering FIG. 1 in conjunction with FIG. 8, a quantity of marking fluid 216 is seen contained in a vessel 218 that is supported by the base plate 214; and a suction line 220 communicates each of the valve blocks 206 with the marking fluid. In order to pump metered quantities of marking fluid from the vessel 218 to the valve blocks 206, a syringe 222, comprising a cylinder and a relatively movable piston, is connected to each of the valve blocks; and vertically reciprocal motion is transmitted to the syringes 222 by means of a traveling block 224 well shown in FIGS. 8 and 9. Bearings 226 are fashioned at the opposite ends of traveling block 224, and the bearings 226 slidably receive the shafts 208 in order to guide vertical movements of the traveling block.

As has been described hereinabove, power is delivered from drive motor 75 to the vicinity of filling station 48 by means including a drive belt 112 and gearing 114 and 118, this power appearing at the rotating shaft 120. As will be seen in FIG. 8, the shaft 120 is coupled to a spur gear 228 which is housed in a gearbox 230. With additional reference to FIG. 9, the power from shaft 120 is seen to be ultimately transmitted to the traveling block 224 by means of a connecting rod or arm 232 and an eccentric 234. The connecting rod 232 is coupled to traveling block 224 by a pivot 236 and passes through openings 238 and 240 fashioned respectively in machine mounting plate 210 and base plate 214.

The eccentric 234 comprises a round disc drilled with an offcentered hole 242 which receives the shaft 120. A key 244 is inserted in alignable keyways milled in the eccentric and in the shaft 120 to fix the parts for rotation together. A thin brass ring 246 surrounds the eccentric 234 to act as a bearing between the eccentric and the walls of the receiving hole or cavity which is fashioned in the lower end of connecting rod 232, ring 246 being secured to the connecting rod to receive the eccentric in a rotatable manner.

The eccentric 234 is arranged as has just been described in order that it may be readily replaceable. In compliance with an important feature of the invention, the eccentric is thus rendered replaceable in order that a substitute eccentric having a different throw can be inserted in the end of the connecting rod to vary the stroke thereof and thereby vary the stroke of the syringes 222 for purposes of altering the metered amount of marking fluid delivered by the nozzles 200 and 202. It is emphasized that the invention contemplates fixed, replaceable eccentrics, rather than adjustable eccentrics in order to provide a strong construction capable of accepting and transmitting reasonably high amounts of power and in order to promote accurate delivery from the filling nozzles.

In compliance with another feature of the invention, power is transmitted from the shaft 120 to the traveling block 224 by a double eccentric arrangement operated from the common drive source which is defined by the shaft 120. Therefore, a second connecting rod 248 is connected to the traveling block 224 by a pivot 250 to be drivingly coupled at its lower end to the shaft 120 by means of an eccentric 252 and a gear train 254. Eccentric 252 is substantially identical to eccentric 234 while gear train 254 is housed within gear box 230 and includes the spur gear 228. In addition to the spur gear 228 which is mounted on the shaft 120, gear train 254 includes laterally aligned and progressively meshing gears 256, 258 and 260, these gears being mounted respectively on shafts 262, 264 and 266. Advantageously, these gears are fabricated from graphited nylon, and the gear shafts are positioned to establish an 0.002 inch preload between the gear centers in order to prevent backlash and ensure accurate movement of the traveling block and therefore accurate delivery from the nozzles 200 and 202. While power is delivered to the gear train from shaft 120, it is recognized that power may be fed into the gear train from any one of the shafts in the train.

The eccentric 252 is non-rotatably mounted to the shaft 266 by a key 268 which enters alignable keyways in the eccentric and in the corresponding shaft, the eccentric being formed with an offcentered hole 270 for receipt of the shaft. The eccentric 252 rides in a brass ring 272 which defines the bearing therefor, ring 272 being secured to the connecting rod for rotatable receipt of the eccentric.

Considering FIG. 10, the valve block 206 is seen fashioned with a connection 274 for the corresponding syringe 222 and with a connection 276 for the correesponding suction line 220. In addition, the valve block 206 houses a double-ball check valve 278 to which access is provided by means of a threaded cap 280. The check valve 278 includes a floating lower ball 282 and an upper ball 284 which is biased to close the path to nozzle 200 by means of a compression spring 286. The nozzle 200 includes a pair of delivery tubes 288 and 290 joined by an elbow unit 292. It should be recognized that the nozzles 202 are constructed and arranged similarly to the nozzle and valve block described with reference to FIG. 10. Returning to FIG. 8, it should be noted that the nozzles 200 and 202 are spaced a small distance above the tops of the marking devices 20 in order to facilitate passage of various sized marking devices therebeneath, it being recalled that the nozzles 200 and 202 are relatively permanently fixed in position by attachment, through the valve blocks 206, to the stationary top mounting bar 204.

In use of the apparatus 40, a marking device with its reservoir felt having been previously compressed at station 46 is indexed to a rest position beneath the initial nozzle 200. At this time, the traveling block 224 will have reached the bottom of its stroke as determined by the motion of connecting rods 232 and 248; and further movement of the traveling block will be in the reverse direction whereby to operate the syringes for delivery of marking fluid from the filling nozzles. A predetermined fraction of its total charge of fluid is thus filled into the marking device under consideration.

At the end of this first filling, the marking device is indexed by the motion of table 42 to a rest position lying between the first nozzle 200 and the first nozzle 202. Then, while a repetition of the filling cycle is occurring, the reservoir felt in the device under consideration is permitted to absorb the marking fluid and expand somewhat before the table 42 removes it to a rest position underlying the first nozzle 202.

This general process of filling and waiting continues until the marking device has passed completely from the filling station 48. When this has occurred, the total charge of marking fluid will have been filled and the reservoir felt will have expanded to substantially its original size and shape.

After the marking devices have been filled with marking fluid at station 48, they are conveyed to the wick-inserting station 50; and as will be seen from an inspection of FIGS. 1 and 2, the individual wicks are delivered to the station 50 from a vibrator hopper 294 through a conveyor 296. The hopper 294 is mounted on the fixed plate 122 and is vibratorily rotated by a motor 298 so as to urge wicks from the interior of the hopper up a spiral track 300 to the conveyor 296.

Considering FIG. 5 for the moment, the felt wick 26 will be seen fashioned as an elongated member with bias-cut ends which are arranged so that the wick takes the general shape of an elongated parallelogram. In addition, the wick is arranged to be narrower than it is wide; and hence, a quantity of the wicks need only be oriented in one attitude to insure a uniform feed to the wick-inserting station. Accordingly, a spring finger 302, shown in FIG. 1, is mounted in the upper reaches of track 300 in order to pass only properly oriented wicks to the conveyor 296. Wicks are delivered from the hopper 294 to the station 50 through the conveyor 296 by gravity alone or with an air-assist.

Figures 11, 12:
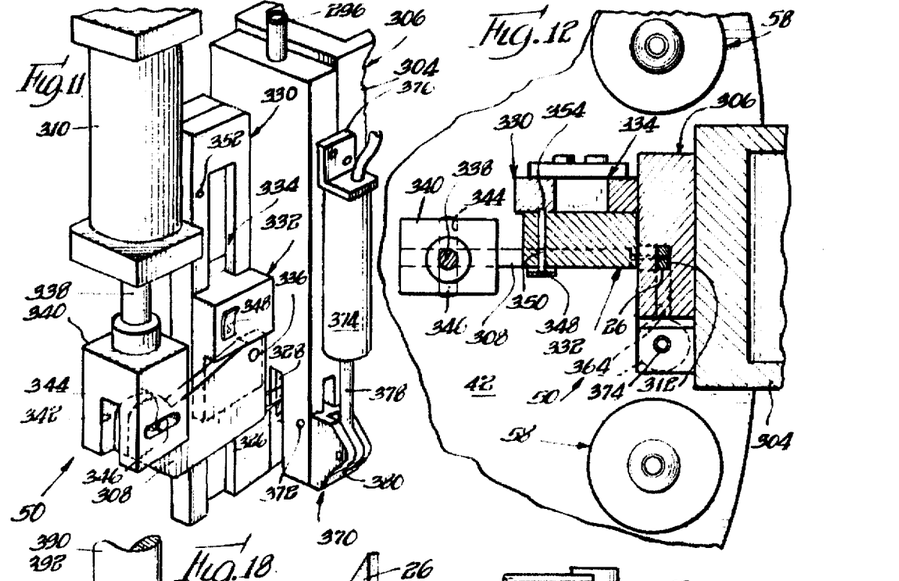
FIG. 11 is an enlarged perspective view of the wick-inserting station of the apparatus of FIG. 1.
FIG. 12 is an enlarged top plan view of the wick-inserting station of FIG. 11.

Considering FIGS. 2, 11 and 12, the wick-inserting station 50 will be seen to include a vertical support 304 that is mounted in upstanding relationship to the extension 108, a wick guide structure 306 fixed to the vertical support and adapted to receive wicks from the conveyor 296, and a jaw 308 which is vertically reciprocably operated by an air cylinder 310.

Continuing with reference to FIGS. 11 and 12 and with additional reference to FIGS. 13–16, the wick guide structure 306 will be seen fashioned with a vertical channel 312 which receives the wicks from conveyor 296, the sidewalls of channel 312 confining the individual wicks to prevent their axial deformation and to insure the wicks remaining in a train of properly oriented parts. As is well shown in FIG. 13, a stop unit 314 is provided for normally arresting the downward movement of the felt wicks through the channel 312. The stop unit 314 includes a soft spring blade 316 that is fastened to a vertical sidewall of guide structure 306 by means of a screw 318 or other suitable fastener. The blade 316 depends a lower end portion into approximate horizontal alignment with a narrow, laterally opening slot 320, slot 320 being formed in one of the sidewalls which define the channel 312 so as to expose a side or lateral face of the lowermost wick contained in the channel. A flexible finger 322 is mounted to the lower end of blade 316 by a coupling 324 to extend its tip through the slot 320 and into obstructing relationship relative to the channel 312. Thus, the stop unit 314 may act to retain the wicks within the channel 312 whereas the flexibility of blade 316 and finger 322 permit an individual wick to be urged therepast in a downward direction.

The jaw 308 is employed in gripping the individual wicks 26 to urge them past the finger 322 and into the necked down portion 30 of the marking device. Accordingly, the guide structure 306 is provided with a lateral slot 326 generally opposite to the slot 320, the jaw 308 carrying a pair of needles 328 which extend into the slot 326 to engage a side or lateral face of the wick 26 which is retained by the finger 322. The needles 328 piercingly engage the wick for positively gripping the same.

In compliance with an important feature of the invention, the needles 328 are driven into the wick before the jaw 308 is stroked downward to deliver the engaged wick into the necked down portion of a marking device disposed at rest in a nest element 58 situated therebeneath. Thus, the felt wick is positively gripped before it is fed into the marking device.

To guide the movements of jaw 308, a fixed block 330 is secured to the guide structure 306, and a movable block 332 is vertically slidably mounted to the block 330 by means of a dove-tailed slide 334, as is best seen in FIG. 11. The movable block 332 carries a pivot pin 336 upon which the jaw 308 is swingably mounted. The air cylinder 310 drivingly reciprocates a shaft 338; and to direct the movement of jaw 308, the shaft 338 carries a block 340 which is fashioned with a vertical, downwardly opening slot 342 in which a heel portion of the jaw 308 resides. Aligned, horizontal slots 344 are fashioned in the depending legs of block 340, and a pin 346 is fixed in a hole formed in the jaw 308. End portions of the pin 346 ride in the opposed slots 344. The slots 344 and the pin 346 cooperate to develop a cam action in the movement of the jaw 308 as will become more apparent hereinafter.

In order to make the movements of jaw 308 distinct and positive, detent means are provided; and these means include a leaf spring 348 fixed to the exposed face of the movable block 332. As is best seen in FIG. 12, spring 348 aggressively abuts one end of a pin 350 that is slidably operable in a horizontal bore fashioned in the movable block 332. An upper detent depression 352 and a lower detent depression 354 are provided in the fixed block 330 in alignment with the vertical path traversed by the free end of pin 350 as will be seen from an inspection of FIGS. 13–16.

For purposes of affording a more complete understanding of the movements and operation of jaw 308, it is advantageous at this juncture to provide a functional description of the mode in which the parts associated therewith cooperate.

Assuming that it is desired to insert a felt wick 26 into a marking device 20 situated at rest in alignment beneath the channel 312, the air cylinder 310 will be suitably actuated to drive the shaft 338 in a downward direction. As will be seen in FIG. 13, this downward movement of the shaft 338 is first realized by a rotation of the jaw 308 about pin 336 and in the direction of arrow 356 due to the pin 350 engaging the detent depression 352 and thereby tending to resist downward motion of the jaw. This rotation of the jaw 308 results in the needles 328 piercingly engaging a side of the wick 26 which is being held by the finger 322, motion of the jaw 308 in the direction of arrow 356 being arrested by the front face of the jaw engaging the confronting vertical surface of guide structure 306.

Figures 13, 14:
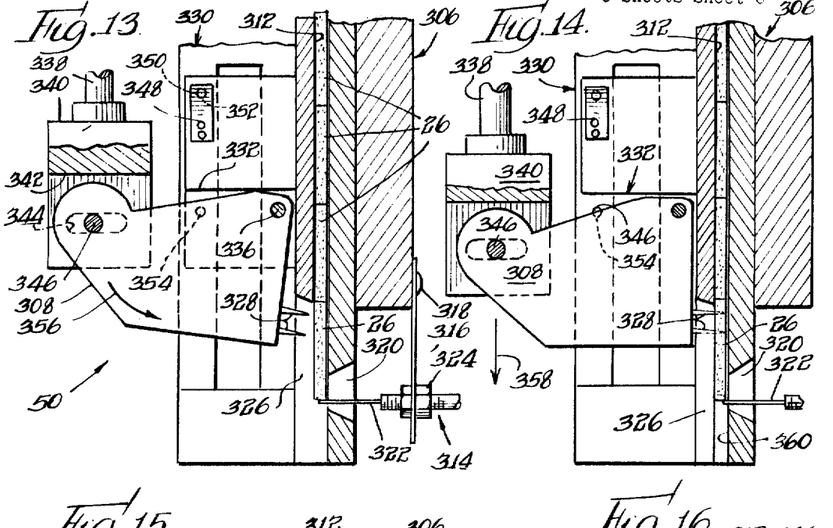
FIGS. 13–16 are side elevational views of the wick-inserting station showing various stages in the gripping of a felt wick and inserting the same into the shell of the marking device.

Thereafter, downward movement of the shaft 338 causes the jaw 308 to move in the direction of arrow 358, pin 350 being withdrawn from depression 352; and correspondingly, the needles 328 drag the engaged wick 26 past the finger 322 and downward toward the waiting marking device in compliance with the illustration of FIG. 14.

Figures 15, 16:
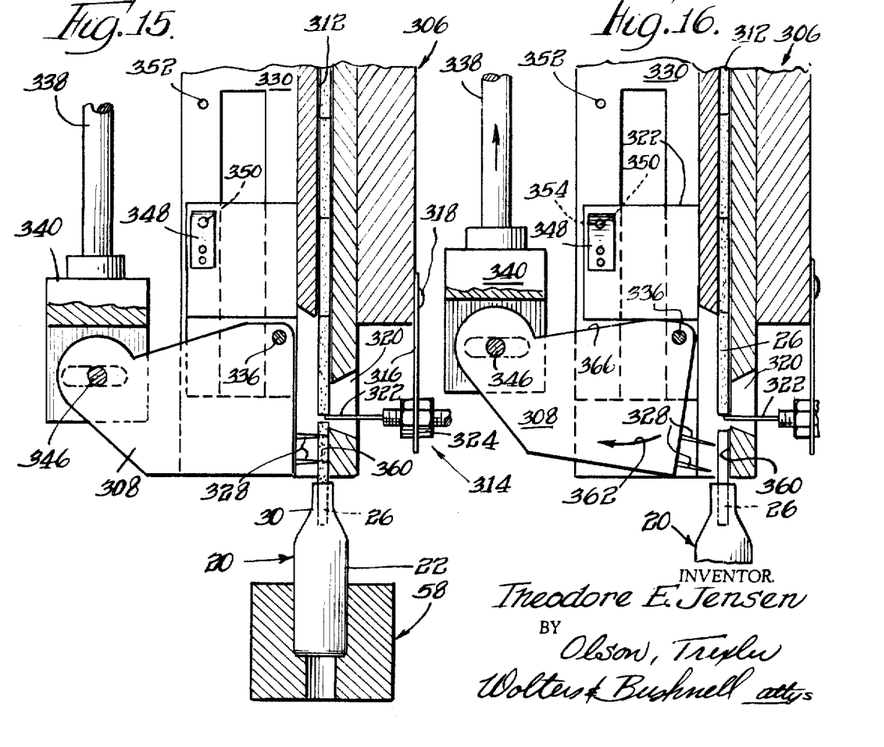

When the wick 26 touches the open top end of the marking device, there is a tendency for the wick to mushroom or snake around; and this tendency is resisted through the restraint established by the sidewalls of channel 312, particularly by a wall portion 360 situated beneath the slot 320 and in general opposition to the jaw 308 as is well shown in FIG. 15. This restraint of the wick permits a driving of the wick into a frictionally gripping aperture without any substantial deformation of the wick. As will be recognized, when the wick is situated in the necked down portion 30 in frictionally gripped relationship, it is possible to position the wick firmly contacting the underlying reservoir felt and extending a comparatively uniform distance above the top edge of the necked down portion. It will be noted in FIG. 15 that the top edge of the necked down portion 30 is spaced a short distance beneath the bottom edge of wall 360; and control of this spacing has been found helpful in preventing distortion of the felt wick during pressure feeding thereof. In one specific embodiment of the invention, this spacing has been selected to vary between 0.0040 and 0.0060 inch, the minimum figure relating to allowable variation in the height of the housings 22 and the maximum figure relating to the prevention of distortion of the wick.

At the bottom of the stroke of shaft 338, the detent pin 350 becomes aligned with the lowermost detent depression 354, and spring 348 urges the pin 350 therein tending to fix the movable block 332 in the corresponding position. Thereupon, retraction of the shaft 338 results in the jaw 308 pivoting in the direction of arrow 362 as is shown in FIG. 16. This swinging action of the jaw withdraws the needles 328 from the felt wick, releasing the felt wick to subsequent movement by the table 42. As is best shown in FIG. 12, the guide structure 306 is provided with a slot 364 at the lower end thereof and opening generally tangential to the path of movement of the marking devices whereby to permit the seated wick to pass from the guide structure upon retraction of the needle 328.

Further retraction of the shaft 338 results in an abutment surface 366 of the jaw 308 contacting a confronting surface of the movable block 332; and thereafter, retraction of the shaft 338 disengages the detent pin 350 from the depression 354 and returns the jaw 308 and the movable block 332 to their uppermost position. There, the detent pin 350 becomes aligned with the uppermost detent depression 352, and spring 348 urges the pin into the depression to hold the movable block at that position whereby to permit rotation of the jaw 308 upon reversing of the movement of the shaft 338, so as to engage a second felt wick in the manner described with reference to FIG. 13.

Figure 11A:
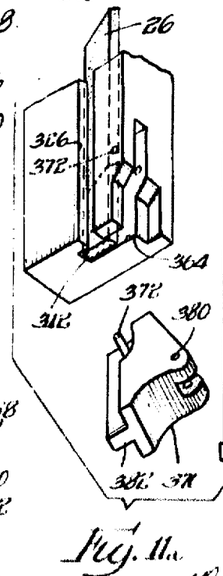
FIG. 11a is a low angle, exploded perspective view of the gate member and guide structure used at the wick-inserting station.

Although it is realized that distortion of the felt wick in the plane of its narrow dimension is much less likely to occur than is distortion in the plane transverse to its face or wider dimension, it has proved advantageous to incorporate a selectively operable gate member 370 for obstructing the slot 364 while the wick is being actively inserted in the necked down portion of a marking device, as is indicated in FIGS. 11 and 11a. The gate member 370 is swingably mounted to the guide structure 306 by a pivot pin 372; and reciprocable actuation of the member 370 is achieved by an air cylinder 374 which is attached to the guide structure by a bracket 376. A piston 378 extends from the air cylinder 374 to be pivotally connected to the gate member 370 by a pin 380, actuation of air cylinder 374 being properly coordinated with actuation of the air cylinder 310 in a conventional manner.

As is best seen in FIG. 11a, the gate member 370 is fashioned with a tongue 382 which slidably enters the slot 364 to confine and restrain the wick while it is being inserted in the necked down portion of the marking device. After the wick has been inserted, air cylinder 374 is actuated to pivot the gate member so that the tongue 382 frees the slot 364 so that the wick element can pass freely from the guide structure.

Figure 17:
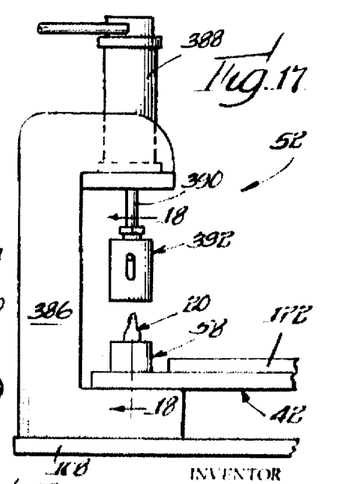
FIG. 17 is an enlarged, side elevational view of the crimping station employed in the apparatus of FIG. 1 whereat the edge of the mouth of the marking device is crimped in order to grip the wick which has been previously inserted.

After the wicks 26 have been inserted in the housings of the marking devices, the table 42 acts to transport the marking devices to crimping station 52 where the lip or edge 32 of the necked down portion is formed inwardly into gripping engagement with the wick. With reference to FIG. 17, the crimping station 52 is seen to comprise a vertical support 386 that is fixed to the extension 108 in upstanding relationship. An air cylinder 388 is affixed to an upper arm portion of the vertical support in alignment with a rest position of the nest elements 58. An extensible and retractable shaft 390 depends from the air cylinder 388 to carry a reciprocable tool 392.

Figure 18:
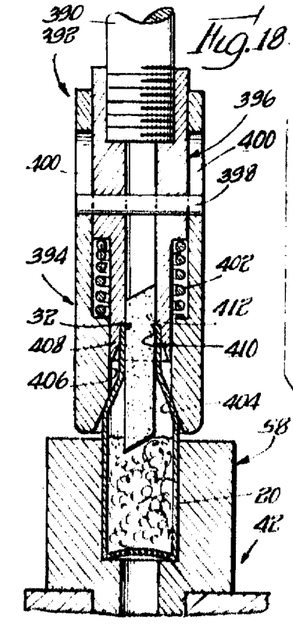
FIG. 18 is an enlarged view taken along the section 18—18 of FIG. 17.

Turning to FIG. 18, the tool 392 is seen to comprise a stripping element 394 which slidably receives a staker core 396. The staker core 396 is fixed to the lower end of the shaft 390, and a cross pin 398 is mounted in the staker core to have its oppositely extending end portions operate slidably in vertical slots 400 which are formed in the sidewalls of the stripping element 394. A compression spring 402 biases the staker core 396 generally toward the uppermost position of the cross pin relative to the slots 400.

The stripping element 394 is fashioned at its lower end with a conical bore 404 which is adapted to receive the sloping shoulders of a marking device in fitting relationship. Furthermore, the stripping element is provided with a cylindrical bore 406 disposed concentric with the conical bore 404; and the staker core 396 includes a crimping element 408 which slidably operates in the bore 406. The crimping element 408 is fashioned with an internal, progressive die surface 410 that performs the actual operation on the lip 32 of the marking device.

Upon the air cylinder 388 extending the piston 390 so as to lower the tooling 392, the conical bore 404 first engages the sloping shoulders of the marking device whereupon further downward movement of the piston 390 urges the staker core 396 toward the top of the marking device, compressing the spring 402 and urging the die surface 410 into operative engagement with the top end of the marking device. A bore 412 formed coaxially with the die surface 410 passes the top end of wick 26 as the die surface engages the top end of the marking device. Upon retraction of the piston 390, the spring 402 serves to separate the stripping element 394 and the staker core 396, the stripping element 394 holding the housing of the marking device to permit stripping of the die surface 410 therefrom.

After the lip of the marking device has been crimped into gripping engagement with the wick, assembling of the cap element to the housing of the marking device is the only operation remaining for completion of manufacture. With reference to FIG. 1, a certain number of unobstructed nest elements 58 are shown disposed between the crimping station 52 and the cap assembling station 54 in order that cap elements may be manually placed on top of the marking devices. At the cap assembling station 54, a tool 414 is reciprocated by the piston 104 pressingly to engage the caps of marking devices which have been positioned therebeneath by the rotation of table 42. The tool 414 is a simple member fashioned with a blind bore configured to receive the cap elements in a comparatively loose fashion.

After the marking devices are indexed from the cap assembling station 54 by the incremental movement of table 42, they may be manually removed from the nest elements 58, or a blast of air may be directed through the bottom bore of the nest element to eject the marking devices into a conveyor tube 416, shown in FIGS. 1 and 2, whereby to direct the finished marking devices to a packaging operation. As will be recognized, tube 416 comprises an unloading station.

Operation of the apparatus 40 is apparent from the above descriptions.

While a particular embodiment of the invention has been shown and described, it should be understood, of course, that the invention is not limited thereto since many modifications may be made; and it is, therefore, contemplated to cover by the present application any such modifications as fall within the true spirit and scope of the appended claims.

The invention is claimed as follows:

1. In apparatus for use in making a marking device, the combination comprising: means for incrementally moving a plurality of open-ended marking devices in a predetermined path; a reciprocable tool overlying said path in alignment with a rest position of a said marking device, said tool including a pin element adapted to pass through the open end of a marking device compressively to engage a resilient absorptive element contained therein; a plurality of filling nozzles aligned with rest positions of said marking device subsequent to said tool and spaced apart along said path for delivering marking fluid to the devices being transported in said path; a wick-inserting arrangement aligned with a rest position of a said device in said path subsequent to said filling nozzles; and a reciprocable crimping tool overlying a rest position of a said device in said path, said crimping tool having a formation adapted to constrict the open end of a said device upon forcible engagement therewith.

2. In apparatus for use in making a marking device, the combination comprising: means for incrementally moving a plurality of open-ended marking devices in a circular path, including an incrementally rotatable table having a plurality of mounting means disposed adjacent the periphery thereof, and further including receptacle means mountable on said table at said mounting means; a reciprocable tool overlying said path in alignment with a rest position of said marking device, said tool including a pin element adapted to pass through the open end of a marking device compressively to engage a resilient absorptive element contained therein; a plurality of filling nozzles aligned with rest positions of a said marking device subsequent to said tool and spaced apart along said path for delivering marking fluid to the devices being transported in said path; a wick-inserting arrangement aligned with a rest position of a said device in said path subsequent to said filling nozzles; and a reciprocable crimping tool overlying a rest position of a said device in said path, said crimping tool having a formation adapted to constrict the open end of a said device upon forcible engagement therewith.

3. In apparatus for use in making a marking device, the combination comprising: means for incrementally moving a plurality of open-ended marking devices in a circular path, including an incrementally rotatable table having a plurality of mounting means disposed adjacent the periphery thereof at intervals corresponding to the increment of movement, and further including receptacle means mountable on said table at said mounting means; a reciprocable tool overlying said path in alignment with a rest position of a said marking device, said tool including a pin element adapted to pass through the open end of a marking device compressively to engage a resilient absorptive element contained therein; a plurality of filling nozzles aligned with rest positions of a said marking device subsequent to said tool and spaced along said path at intervals corresponding to a multiple of the increment of movement of said devices for delivering marking fluid to the devices being transported in said path; a wick-inserting arrangement aligned with a rest position of a said device in said path subsequent to said filling nozzles; and a reciprocable crimping tool overlying a rest position of a said device in said path, said crimping tool having a formation adapted to constrict the open end of a said device upon forcible engagement therewith.

4. In apparatus for use in making a marking device, the combination comprising: means for incrementally moving a plurality of open-ended marking devices in a predetermined path, including an incrementally movable conveyor having a plurality of mounting means disposed in alignment with said path at intervals corresponding to the increment of movement, and further including receptacle means mountable on said conveyor at said mounting means, a said receptacle means comprising a body apertured to receive a said marking device and a coupling element adapted to cooperate with a said mounting means; a reciprocable tool overlying said path in alignment with a rest position of a said marking device, said tool including a pin element adapted to pass through the open end of a marking device compressively to engage a resilient absorptive element contained therein; a plurality of filling nozzles aligned with rest positions of a said marking device subsequent to said tool and spaced apart along said path at intervals corresponding to a multiple of the increment of movement of said devices for delivering marking fluid to the devices being transported in said path; a wick-inserting arrangement aligned with a rest position of a said device in said path subsequent to said filling nozzles; and a reciprocable crimping tool overlying a rest position of a said device in said path, said crimping tool having a formation adapted to constrict the open end of a said device upon forcible engagement therewith.

5. In apparatus for use in making a marking device, the combination comprising: means for incrementally moving a plurality of open-ended marking devices in a predetermined path; a reciprocable tool overlying said path in alignment with a rest position of a said marking device, said tool including a pin element adapted to pass through the open end of a marking device compressively to engage a resilient absorptive element contained therein; a plurality of filling nozzles aligned with rest positions of a said marking device subsequent to said tool and spaced apart along said path; a wick-inserting arrangement aligned with a rest position of a said device in said path subsequent to said filling nozzles, including opposed members confining a wick and including a reciprocable member for urging said confined wick into the open end of a said device; and a reciprocable crimping tool overlying a rest position of a said device in said path, said crimping tool having a formation adapted to constrict the open end of a said device upon forcible engagement therewith.

6. In apparatus for use in making a marking device, the combination comprising: receptacle means for a marking device; a guide structure having a channel aligned with said receptacle means and elongated to pass a flexible wick to said marking device, walls of said channel confining said wick against axial deformation and defining a lateral slot exposing a side portion of said wick; means delivering a wick to said channel; and a reciprocable member having a portion operable in said slot and including means engaging a said wick for transporting and inserting said wick into the open end of a said marking device.

7. In apparatus for use in making a marking device,. the combination comprising: receptacle means for marking device; a guide structure having a channel aligned with said receptacle means and elongated to pass a flexible wick to said marking device, walls of said channel confining said wick against axial deformation and defining a lateral slot exposing a side portion of said wick; means delivering a wick to said channel; and a reciprocable member having a portion operable in said slot and including means aggressively engaging a said wick for transporting and impelling said wick into the open end of a said marking device in an interference fit.

8. In apparatus for use in making a marking device, the combination comprising: receptacle means for a marking device; a guide structure having a channel alignable with said receptacle means and elongated to pass a flexible wick to said marking device, walls of said channel confining said wick against axial deformation and defining a first lateral slot exposing a side portion of said wick and further defining a second lateral slot exposing an edge of said wick at right angles to the exposed side portion thereof; means delivering a wick to said channel; a reciprocable member having a portion operable in said first slot and including means engaging a said wick for transporting and inserting said wick into the open end of a said marking device; a gate member pivoted to swing about a position adjacent one end of said second slot; and drive means connected to said gate member to swing said gate member for selectively opening and closing said second slot to passage of a said wick therethrough.

9. In apparatus for use in making a marking device, the combination comprising: receptacle means for marking devices; a guide structure having a channel alignable with said receptacle means and elongated to pass flexible wicks one at a time to marking devices contained in said receptacle means, walls of said channel confining said wicks against axial deformation and defining a lateral slot exposing a side portion of a said wick; means delivering spatially oriented wicks to said channel; means releasably restraining said wicks at a position adjacent one end of said slot; and a reciprocable member having a portion operable in said slot and including means engaging a said wick for withdrawing a said wick from said restraining means and inserting said withdrawn wick into the open end of a said marking device.

10. In apparatus for use in making a marking device, the combination comprising: receptacle means for marking devices; a guide structure having a channel alignable with said receptacle means and elongated to pass flexible wicks one at a time to marking devices contained in said receptacle means, walls of said channel confining said wicks against axial deformation and defining a lateral slot exposing a side portion of a said wick; means delivering spatially oriented wicks to said channel; means releasably restraining the lowermost wick at a position adjacent the upper end of said slot; and a reciprocable member having a portion operable in said slot and including means engaging a said wick for withdrawing a said wick from said restraining means and inserting said withdrawn wick into the open end of a said marking device.

11. In a method of inserting a flexible, elongated wick of rectangular cross-section in the neck of a marking device housing, the steps comprising: delivering a said wick to a position aligned with the open-ended neck of a marking device housing; guidably engaging said wick on at least three lateral sides to confine said wick during its insertion in said neck; piercingly engaging a lateral side of said wick with a drive element and at a position away from the guidably engaged regions of said wick; moving said drive element generally toward said marking device to impel said wick into said neck in an interference fit; and releasing said guidable engagement on one lateral side of said wick to free the assembled wick and housing for transit.

References Cited by the Examiner

UNITED STATES PATENTS

| | | | |
|---|---|---|---|
| 2,026,601 | 1/1936 | Young | 141—7 |
| 2,028,266 | 1/1936 | Anderson | 141—146 |
| 2,032,040 | 2/1936 | Barrett | 53—276 |
| 2,169,573 | 8/1939 | Vogt | 141—146 |
| 2,360,423 | 10/1944 | Johnson et al. | 53—324 |
| 2,367,756 | 1/1945 | Cummings | 53—101 X |
| 2,841,937 | 7/1958 | Miskel et al. | 53—276 |
| 2,855,006 | 10/1958 | Geisler | 141—7 |
| 3,089,182 | 5/1963 | Lofgren | 15—563 |
| 3,124,917 | 3/1964 | Dobbins et al. | 53—43 X |

TARVIS S. McGEHEE, *Primary Examiner.*